United States Patent [19]

Chiu et al.

[11] 4,356,218

[45] Oct. 26, 1982

[54] LIQUID COATING METHOD AND APPARATUS

[75] Inventors: Herman S. Chiu, Chicago; Keith A. Watts, Western Springs, both of Ill.

[73] Assignee: Union Carbide Corporation, Danbury, Conn.

[21] Appl. No.: 261,457

[22] Filed: May 7, 1981

[51] Int. Cl.³ .................. A21D 13/00; A23L 1/27; B05D 3/12; C12C 5/04
[52] U.S. Cl. .................................. 427/355; 118/13; 118/18; 118/112; 118/125; 118/264; 118/266; 118/267; 426/138; 426/250; 427/429
[58] Field of Search .............. 118/13, 18, 112, 125, 118/264, 266, 267, 34, 405; 427/355, 429, 230; 426/138, 250; 26/80; 264/134

[56] References Cited

U.S. PATENT DOCUMENTS

| | | | |
|---|---|---|---|
| 2,873,715 | 2/1959 | Signer | 427/230 X |
| 3,690,294 | 9/1972 | Harper | 118/112 |
| 3,851,075 | 11/1974 | Wisdom | 426/250 |
| 3,877,414 | 4/1975 | Brideau et al. | 118/234 |
| 3,945,404 | 3/1976 | Yamamatsu et al. | 426/135 X |
| 3,956,539 | 5/1976 | O'Brien | 426/235 X |
| 4,212,908 | 7/1980 | Hendy et al. | 427/355 |
| 4,278,694 | 7/1981 | Chiu | 426/138 X |

Primary Examiner—Michael R. Lusignan
Attorney, Agent, or Firm—Real J. Grandmaison; John C. LeFever

[57] ABSTRACT

The exterior wall of an inflated flexible tubing is moved through an inner opening of a first flexible and resilient means and displaces the opening edge while liquid is applied by rubbing contact. The liquid coating is then smoothed by movement through the inner opening of a rotating second flexible and resilient means.

29 Claims, 10 Drawing Figures

LIQUID COATING METHOD AND APPARATUS

BACKGROUND OF THE INVENTION

This invention relates to a method of and apparatus for liquid coating the exterior wall of a longitudinally moving, inflated flexible tubing of varying cross-section with a continuous liquid film of substantially uniform thickness, as for example liquid smoke on a cellulosic tubing for ultimate use as a food casing.

DESCRIPTION OF THE PRIOR ART

The exterior wall of an inflated flexible tubing has been coated with liquid by several prior art systems, including dipping in a liquid bath and spraying. By way of illustration, "gel stock" cellulosic tubings have been coated in the manner of Signer U.S. Pat. No. 2,873,715 by continuously moving an inflated tubing upwardly through an opening in a chamber in a reservoir for containing the coating composition. An elastic rubber seal encloses the opening, the seal having a diameter normally smaller than the inflated tubing and adapted to ride on and follow the entire peripheral wall of the inflated tubing, thereby providing a leak-proof seal therebetween. It has been found that the so-coated liquid tended to drain down the exterior wall of the tubing and provide an uneven coating. Also the liquid seal was difficult to maintain when the rate of tubing movement through the coating assembly was high, as needed in commercial operation.

Inflated flexible tubing has also been coated by spraying techniques such as described in Hendy et al. U.S. Pat. No. 4,212,908. Here the inflated and flexible tubing is moved downwardly through a spray-type coating assembly which is rotated around the tubing during its movement. In addition to the aforementioned vertical drainage problem, there is another problem associated with the inevitable fluctuation in tubing diameter when the tubing is formed of flexible material and is coated in the inflated condition. It has been discovered that the rotating spray-type applicator does not provide coatings which are sufficiently uniform for adequate smoothing into a continuous film of substantially uniform thickness by the downstream spreading members described by Hendy et al.

Another problem associated with the spray-type applicator is the resulting mist pollution of the area surrounding the applicator.

A further problem associated with prior art apparatus for liquid coating the exterior wall of an inflated flexible tubing is that previously known liquid-coated tubing support systems disturb the continuity of the coating before it dries. This problem is particularly serious when the tubing is horizontally oriented, due to gravitational migration of the liquid to the tubing underside.

One object of this invention is to provide a method for coating the exterior wall of an inflated and flexible tubing so as to provide a continuous film of substantially uniform thickness around the entire exterior wall.

A further object is to provide such apparatus with support means for the coated tubing which does not disturb the liquid film during its drying period.

Other objects and advantages of the invention will become apparent from the ensuing disclosure and appended claims.

SUMMARY OF THE INVENTION

In one aspect of this invention an apparatus is provided for liquid coating the exterior wall of an inflated flexible tubing during its longitudinal movement. This apparatus includes: first flexible and resilient means with an inner circular opening having a slightly smaller diameter than the diameter of the inflated flexible tubing exterior wall. This first means is transversely positioned relative to the tubing axis and arranged such that the inflated flexible tubing may be moved in its longitudinal direction through the inner circular opening so as to displace the circular opening edge while maintaining rubbing contact therewith. Means are provided for supplying the liquid to the first means for distribution thereby, so as to be applied to the longitudinally moving inflated flexible tubing exterior wall during the rubbing contact.

A second flexible and resilient means is provided with an inner circular opening and the second means is rotatable around the opening center. This second means opening also has a slightly smaller diameter than the diameter of the inflated flexible tube exterior wall. The second means is positioned adjacent to but spaced downstream from the first flexible and resilient means. The second means is also positioned transversely with respect to the longitudinally moving tubing so that the tubing with the coating on its external wall may be moved through the second means inner circular opening. This movement displaces the rotating circular opening edge while maintaining rubbing contact therewith for smoothing the applied liquid on the tubing exterior wall into a film of uniform thickness. Means are also provided for rotating the second means around the tubing axis during longitudinal movement of the tubing through the second means so as to maintain the aforementioned rubbing contact while smoothing the liquid into a continuous film of substantially uniform thickness on the tubing exterior wall.

Another aspect of this invention involves a method for coating the exterior wall of a longitudinally moving inflated and flexible tubing of varying cross-section with liquid. This method includes the steps of continuously moving the inflated flexible tubing in the longitudinal direction along a straight line, and providing first flexible and resilient means with an inner circular opening of slightly smaller diameter than the diameter of the inflated tubing exterior wall. Liquid is supplied to the first means inner circular opening. The inflated tubing is moved through the first means inner circular opening and rubbing contact is maintained with the opening edge, thereby displacing this edge. The liquid is simultaneously applied to and distributed around the inflated tubing outer wall by way of the rubbing contact.

This method also includes the provision of second flexible and resilient means with an inner circular opening of slightly smaller diameter than the diameter of the inflated tubing exterior wall. The second means is rotated around its centerline axis and the inflated tubing with the so-applied liquid is moved through the rotating second member inner circular opening, displacing the opening edge but maintaining rubbing contact with the opening edge. The liquid coating is simultaneously smoothed as a continuous film of substantially uniform thickness of the tubing exterior wall.

In a preferred embodiment, the liquid is wood-derived liquid smoke, and the tubing is a cellulosic material to be ultimately used for encasing food product.

Other liquids such as water, a latex, or a dye solution may be employed as the coating liquid. Also, the tubing may, for example, be formed from plastic film or rubber.

The first flexible and resilient means is preferably formed of absorbent material with the liquid supplying means extending therethrough. The second flexible and resilient means is also preferably formed of absorbent material. Alternatively, the first and/or the second means may be in other forms, as, for example, brushes or thin flexible and resilient discs.

DESCRIPTIONS OF THE PREFERRED EMBODIMENTS

Figure 1:
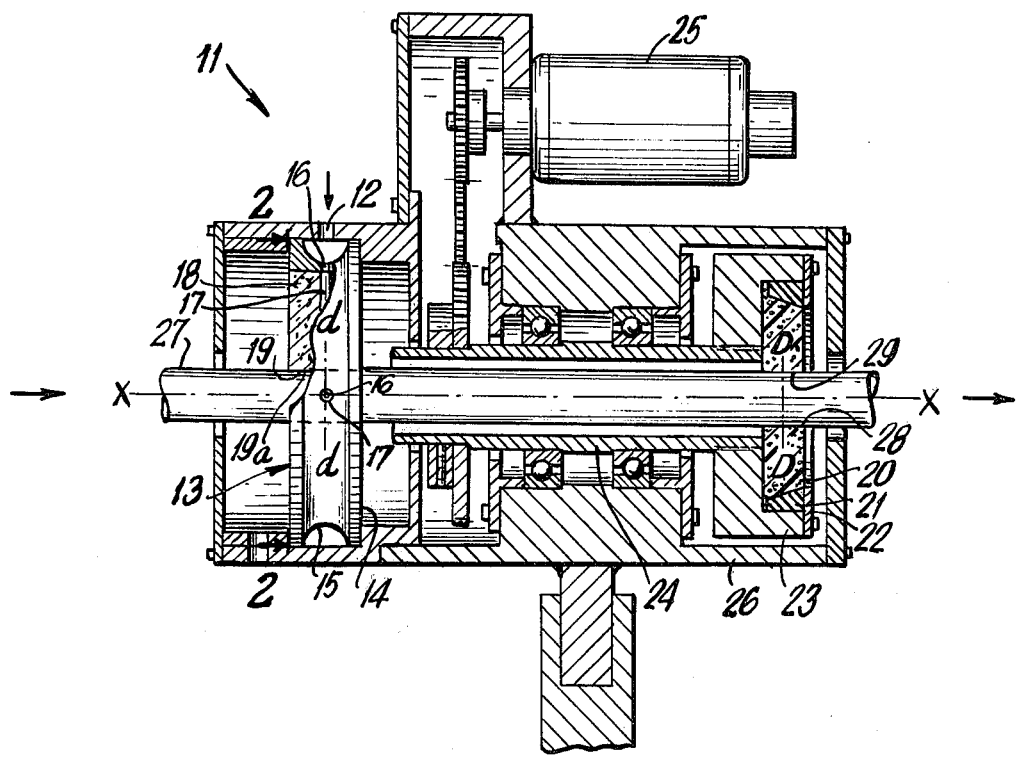
FIG. 1 is an elevation view, with certain parts in cross-section, of an absorbent-type liquid applicator-smoother assembly embodiment of the invention.

Referring now to the drawings, a preferred embodiment of the invention will be described in detail. In FIG. 1, liquid applicator-smoother assembly 11 is provided for coating of an inflated flexible cellulosic tubing moving therethrough in a horizontal direction from left to right. The inflated flexible tubing external surface is coated with wood-derived liquid smoke which, for example, may be pumped to an elevated pressure, such as 20–25 psig, and introduced through liquid inlet port 12 into and around the annular liquid distribution applicator ring assembly 13 as illustrated more clearly in FIGS. 2 and 3. Assembly 13 includes applicator support member 14 having grooved annular distribution ring 15 in its outer edge. Multiple (e.g. four) liquid inlet tubes 16 are positioned at preferably equal intervals around distributor 15, and a slightly larger diameter flexible distribution tube 17 is positioned around the inner end of each inlet tube 16. The inner wall of flexible tube 17 and the outer wall of inlet tube 16 are preferably sized to form a press fit for support of tube 17. Positioned within support member 14 is a ring formed of absorbent material 18 as the aforementioned first flexible and resilient means. A preferred absorbent material is an open-celled polyurethane foam, as for example "Omalon 9," manufactured by the Olin Corporation (120 Long Ridge Rd., Stanford, Conn. 06904). This particular foam has "Wicking Capability", as hereinafter described.

From annular distributor ring 15 the liquid flows very evenly through each inlet tube 16 because of the substantial pressure drop. As illustrated, the four flexible inner distribution tubes 17 are positioned within and entirely enclosed by the first means 18 at 90 degree intervals around the annular ring 15, and in the same transverse plane as the first means. Accordingly, tubes 17 are essentially normal to the longitudinal movement of the inflated tubing through liquid applicator-smoother smoother assembly 11. The flexible inner distribution tubes 17 are thus surrounded by the absorbent first means 18 so that the liquid must flow from the tubes 17 onto and around the inflated flexible tubing surface.

As used herein, the presence or absence of "Wicking Capability" of the flexible and resilient absorbent embodiments of first or second means of this invention is determined by placing a sample of the absorbent material, one inch by one inch by three inches, in a pan of water at 25° C. so that the one inch by one inch face of the foam touches the bottom of the pan. In general, wicking is the ability of an absorbent material to soak up a liquid. In this instance, if the absorbent material has the ability to pull the water up past the liquid level in the pan, it has Wicking Capability. Numerous foam absorbent materials were tested in this manner and nearly all did nothing more than displace the liquid due to entrapped air in the foam. The water did not rise in the absorbent sample above the surrounding liquid level. This was true of all closed cell foams and most open cell foams. Included in the group of foam-type absorbents which did not exhibit Wicking Capability are those manufactured from polyurethane by the Tenneco Corporation, P.O. Box 2482, Houston, TX 77001 and marketed with the following product numbers: 4673, 8673H, 1800, 7900 and 1821. Another group of foam-type absorbents which do not have Wicking Cabability are those manufactured by Illinois Fibre Specialty Company, So. Western Blvd., Chicago, IL 60609, marketed with the following product numbers: 2011, 2060 and 2032. A further group of foam-type absorbents without Wicking Capabability are the following products of Scott Paper Company, Scott Plaza, Philadelphia, PA 19113: Filter Foam, Scotfelt, Customfoam, Customfelt, Colorfoam, Safety Foam, Pyrell and Aquacell.

The previously mentioned Omalon 9 pulled water up at least one half inch above the liquid surface and thus demonstrated Wicking Capability. The same is true of "Omalon 10" (another open-celled polyurethane foam manufactured by the Olin Corporation), which pulled water up $\frac{1}{4}$-$\frac{3}{8}$ inch above the liquid surface.

The Wicking Capability of the absorbent material (preferably comprising first means 18) allows the liquid to be distributed around the exterior wall of the inflated tubing. This absorbent first means 18 is also flexible and resilient so that it expands and contracts with the tubing whenever the inflated tubing diameter changes. Thus it allows inflated flexible tubing of varying diameter to remain in contact with the edge 19a as the tubing passes through inner circular opening 19 of first means 18.

The inner circular opening 19 is of slightly smaller diameter than the normal diameter of the inflated flexible tubing moving longitudinally therethrough. Preferably the diameter of the inner circular opening of the absorbent-type first means is between about 12% and about 20% smaller than the Normal Outside Diameter of the inflated flexible tubing. If this relationship is less than about 12%, an under-inflated flexible tubing may not remain in contact with opening edge 19a. On the other hand, if it is more than about 20%, the inner opening 19 may be too small to allow the inflated tubing to freely pass through the opening. The relationship between these dimensions and the amount of liquid pressure in the inlet tubes 16 determines the amount of liquid which can be applied to the longitudinally moving tubing exterior wall.

By way of illustration, with four 0.026 inch inside diameter liquid inlet tubes 16 of 0.445 inch length and four 0.025 inch inside diameter flexible silicone plastic inner distribution tubes 17 joined thereto, it is desired to apply 10 mg. of Charsol C-6 (Red Arrow Products Co., P.O. Box 407, Manitowoc, WI) per square inch of casing exterior surface. The outside diameter of the first member 18 as installed in member 14 is 2.375 inch and the inside diameter (without displacement by tubing moving therethrough) is 0.662 inch. This particular assembly with the first member 18 formed of Omalon 9 absorbent and having a thickness of 0.5 inch, has been successfully used to coat cellulosic casing of 0.828 inch Normal Outside Diameter with this liquid smoke. As used herein, "Normal Outside Diameter" refers to the arithmetic average of the smallest and largest diameters of the inflated tubing during its longitudinal movement through the liquid applicator-smoother assembly. Accordingly, the inside diameter of the first flexible and resilient means is 0.662 inch or 20% smaller than the Normal Outside Diameter of 0.828 inch for this inflated cellulosic tubing.

When the liquid to be applied is a wood-derived liquid smoke and the tubing is the cellulosic type, this invention is preferably practiced on the wet casing prior to drying. Accordingly, the Normal Outside Diameter is the wet end inflated diameter of the cellulosic tubing.

With the aforedescribed relationship, the absorbent type of first applicator means 18 is deformed into a cone shape and its central opening edge 19a maintains rubbing contact with the longitudinally moving inflated tubing. The flexible inner distribution tubes 17 inside first applicator member 18 also flex in the direction of tubing longitudinal travel. Close inspection of the as-described applicator operation reveals a liquid ring around the exterior wall of the tubing where it contacts the applicator means 18, thus demonstrating uniform circumferential application of the liquid.

Spaced downstream from liquid distribution applicator assembly 13 is second flexible and resilient means 20. In some liquid coating operations the second means may be formed of the same material as the first means and preferably has Wicking Capability. However when liquid smoke is to be applied to the external surface of a cellulose tubing, the second means is preferably formed from flexible and resilient material without Wicking Capability. For example, Omalon 9 demonstrated that it wicked off too much of the liquid smoke during the smoothing operation.

In this particular embodiment second member 20 is preferably formed of an open-celled polyester foam commercially designated "100 Char Z" by the manufacturer, Scott Paper Company. The open cellular foam member 20 is 0.5 inch thick and provided with inner circular opening 28 of slightly smaller diameter than the outer diameter of the normal inflated flexible tubing. The as-installed outside diameter of member 20 in this example is 3 inches, and inside diameter (without displacement by tubing moving therethrough) is 4% to 7% smaller than the allowable lower size limit of the inflated wet casing diameter. Accordingly, using a Normal Outside Diameter of 0.828 inch, and the allowable lower size limit being 0.813 inch diameter, the member 20 inside diameter may range from 0.756 inch to 0.780 inch. When applying Charsol C-6 to a cellulose casing having a Normal Outside Diameter of 0.828 inch, the inside diameter of the second means 20 was 0.756 inch, so that it was 7% smaller than the allowable lower size limit for the inflated wet cellulose casing.

Second means 20 is positioned between spacer 21 and retaining ring 22, which is in turn secured to housing 23. The smoother assembly comprising elements 21, 22, and 23 is joined to the outer end of rotor 24 which is mechanically connected to drive mechanism 25. The entire assembly, with the exception of drive mechanism 25, is assembled within housing 26.

In operation, the inflated flexible tubing 27 is continuously moved in the longitudinal direction along a straight line as for example represented by its centerline axis x—x in FIG. 1, into the liquid applicator-smoother assembly 11.

The inflated tubing 27 first moves through the inner circular opening 19 of first flexible and resilient means 18 in a direction substantially normal to the opening diameter d—d and in rubbing contact with the opening edge 19a whose contacting surface is generally parallel with the inflated tubing exterior wall, ignoring irregularities in each surface. Simultaneously, liquid smoke flows inwardly as a multiplicity of discrete streams through inlet tubes 16 and joins flexible tubes 17 for discharge into the first means 18. The so-discharged liquid is absorptively dispersed between the discharge regions within the entire circumference of the absorptive material, and distributed to edge 19a for application therefrom to the tubing wall.

As previously explained, this so-applied liquid has a tendency to flow to the underside of tubing 27 if the latter's longitudinal movement is horizontal. This can be avoided by moving the casing still in the same straight line X—X through rotating center opening edge 29 whose contacting surface is generally parallel with the inflated tubing exterior wall, ignoring irregularities in each surface. The rotating flexible and resilient second means' inner circular opening 28 is of slightly smaller diameter than the diameter of the inflated tubing exterior wall moving longitudinally therethrough with liquid thereon. In a preferred embodiment, the second flexible and resilient means' inner circular opening 28 is between about 4% and about 7% smaller than the Normal Outside Diameter of the inflated flexible tubing. The rotating opening edge 29 is in rubbing contact with the liquid-coated exterior wall and is displaced thereby, so as to simultaneously smooth the liquid coating as a continuous film of substantially uniform thickness on the tubing exterior wall. If the aforementioned diameter relationship is less than about 4%, the inflated tubing may not remain in sufficient contact with the second resilient means 20 to assure that the liquid will be smoothed uniformly. On the other hand, if it exceeds about 7%, the second resilient means 20 may act as a doctoring device and undesirably scrape off liquid instead of smoothing the liquid on the inflated tubing external surface as needed to give a substantially uniform liquid film coating.

The rotational speed of second flexible and resilient means 20 is selected for each embodiment on the basis of opposing considerations. It should be sufficient to aid in redistributing the liquid evenly onto the flexible tubing exterior surface. However, the rotational speed of second means 20 should not be so high as to cause centrifugal spin-off of the liquid from the inflated tubing exterior wall. For the illustrated and described embodiment, to apply a uniform liquid smoke coating to a cellulose tubing, a rotational speed of 200-250 RPM has been found suitable.

The as-described liquid applicator-smoother assembly 11 of this example has been successfully used to coat cellulosic tubing with liquid smoke at rates of 125-128 feet of tubing length per minute.

The tubing emerges from the liquid applicator-smoother assembly 11 with an external surface having a continuous film of substantially uniform thickness thereon. It may then be moved in the longitudinal direction to a dryer. If the tubing is to be used as food casing, drying may be needed for removal of a portion of its moisture content prior to shirring. The latter involves compression or compaction of the liquid smoke-coated tubing to an accordion or pleated configuration, as well understood by those skilled in the food casing art. In commercial operation this longitudinal movement must occur when the liquid smoke film or coating is still in the liquid state, yet the liquid coated tubing cannot be handled in a manner which will disturb the continuity of this film. It has been discovered that this problem may be overcome by supporting the liquid film-coated inflated tubing with a multiplicity of point supports spaced from the second flexible and resilient means, and positioned in at least one transverse plane relative to the longitudinal axis of the moving liquid film-coated inflated tubing. Each point support in a particular transverse plane has a rounded inner end for supporting contact with the liquid film-coated exterior wall of the tubing. These curved inner ends in a particular transverse plane are in spaced relation from each other. The contact points only temporarily displace the liquid film, and the latter quickly recovers the displaced regions after the affected tubing section moves beyond the contact points.

Figure 2:
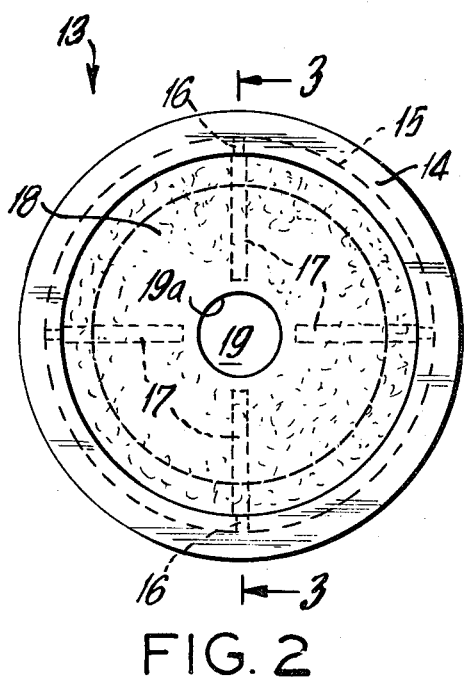
FIG. 2 is an end view of the annular liquid distribution-applicator ring assembly taken along line 2—2 of the FIG. 1 apparatus.
Figure 3:
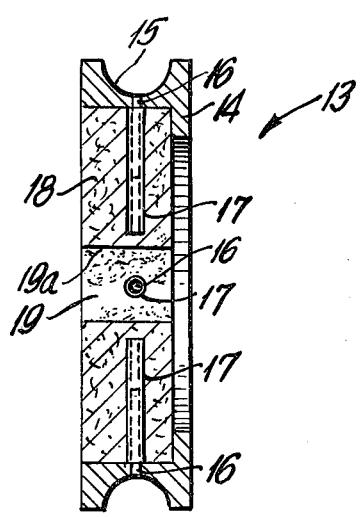
FIG. 3 is a sectional elevational view taken along line 3—3 of the FIG. 2 annular liquid distribution-applicator ring assembly.
Figure 4:
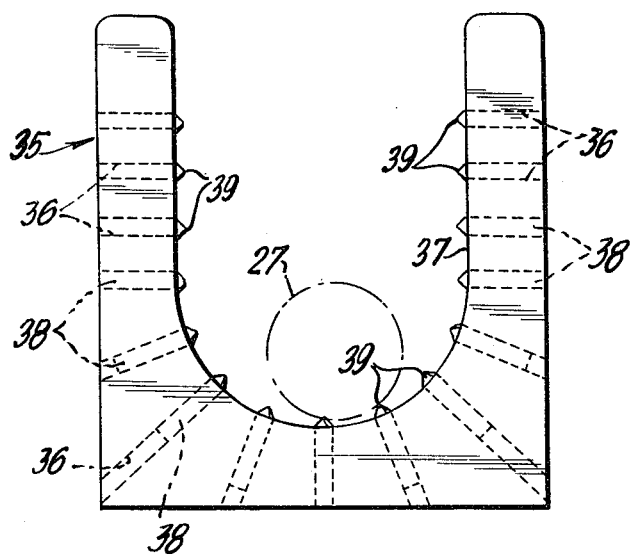
FIG. 4 is an end view of a point support assembly suitable for use with the FIG. 1 absorbent-type liquid applicator-smoother assembly in the processing of a liquid film-coated inflated tubing.
Figure 5:
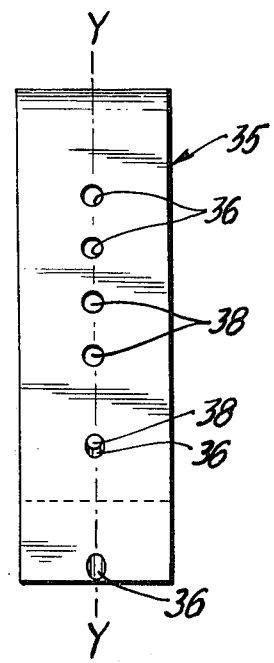
FIG. 5 is an elevation view of the FIG. 4 point support assembly.
Figure 6:
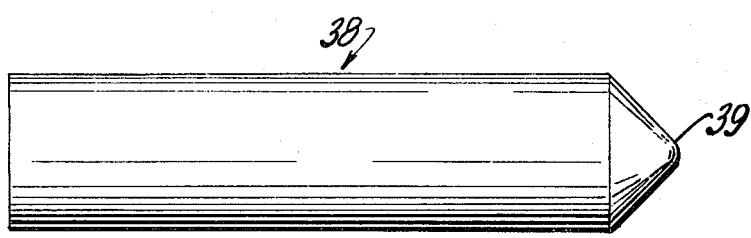
FIG. 6 is an enlarged elevation view of a rod-type point support member suitable for use in the FIGS. 4–5 assembly.

Referring now to FIGS. 4 and 5, they illustrate a particular embodiment of the tubing point support assembly used with the FIGS. 1-3 liquid applicator-smoother assembly 11 in the previously described example for a liquid smoke coated cellulosic casing. FIG. 6 illustrates the point supports used in the FIGS. 4-5 assembly. In FIG. 4, "U" frame 35 for the point supports is provided with a multiplicity of holes 36 drilled into the inner wall 37 of frame 35 in the same transverse plane Y—Y (see FIG. 5). In this example, these holes are ⅛ inch diameter and spaced ⅜ inches center-to-center around the inner wall. The point supports are in the form of plastic rods 38 having rounded inner ends 39, as illustrated in FIG. 6. In this example the rods are ⅛ inch diameter tetrafluoroethylene terephthalate ("Teflon") members with their outer ends and bodies pressed into holes 36 so that only the rounded inner ends 39 project from the support inner wall 37.

The longitudinally moving liquid film-coated inflated tubing 27 as illustrated in the FIGS. 4-5 rides in only the bottom section of the "U" shaped frame 35, touching only the rounded inner ends 39 of the point supports 38 positioned in this section. It will be recognized that more of the illustrated point supports may be used with larger diameter inflated flexible tubing, and that any desired number of the assemblies may be positioned in spaced planes transverse to the longitudinal path of the film-coated inflated tubing.

In the previously described and illustrated embodiments of the invention, absorbent material was used as the first and second flexible and resilient means. Either or both these means may be in other forms, such as the brush illustrated in FIGS. 7 and 8, or the thin disc illustrated in FIGS. 9 and 10. In these drawings, elements corresponding to those in FIGS. 1-3 are identified by the same number plus one hundred (FIGS. 7 and 8) or two hundred (FIGS. 9 and 10).

Figure 7:
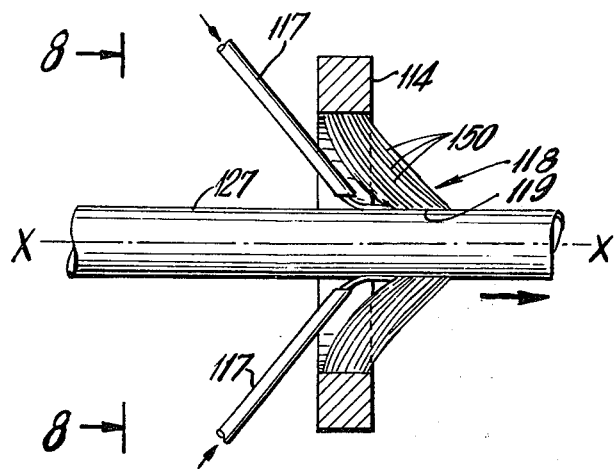
FIG. 7 is a schematic elevational view, with certain parts in cross-section, of a brush-type liquid applicator-distributor embodiment of the first means.
Figure 8:
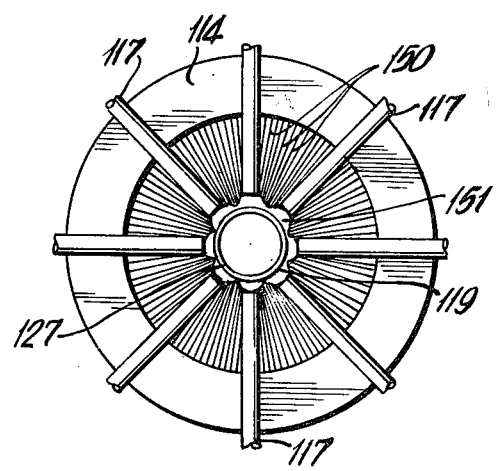
FIG. 8 is an end view of the FIG. 7 brush-type liquid applicator-distributor taken along line 8—8.

In FIGS. 7 and 8, individual hairs or hair clusters 150 have their outer ends positioned in and retained by ring-shaped support member 114, and their inner ends pointed toward the centerline axis x—x of the inflated flexible tubing 127 as it moves in the longitudinal direction through the liquid applicator-smoother assembly. These individual hairs 150 are preferably uniformly spaced around the inner perimeter of support member 114 and transversely aligned relative to the flexible tubing axis before longitudinal displacement by the moving inflated flexible tubing. This ring of individual hairs forms a brush embodiment of first flexible and resilient means 118, and the inner ends form an inner circular opening 119 having slightly smaller diameter than the diameter of the inflated flexible tubing exterior wall. As the tubing 127 moves through opening 119, the hairs are displaced in the direction of tubing movement, as illustrated in FIG. 7.

The coating liquid is supplied from an annular liquid distribution ring which may be the general type illustrated in FIGS. 2 and 3, to the tubes 117 which are preferably spaced at equal intervals around the perimeter of the brush inner circular opening 119. They are positioned immediately upstream of brush-type first means 118 and if rigid should be inclined towards the direction of tubing longitudinal movement. However, they are preferably of flexible construction and are displaced in the direction of inflated flexible tubing longitudinal movement by the tubing outer surface in the same manner as brush 118 and liquid distribution tubes 17 of FIGS. 2 and 3. In operation, the liquid is supplied to the tubing exterior wall in the region where the inflated tubing 127 contacts the brush. The hair serves to aid distribution of the liquid around the entire tubing exterior wall as a liquid film 151. The same type of circular brush assembly may be employed as the second flexible and resilient member, but of course without liquid distribution tubes 117 and with rotating means as for example illustrated in FIG. 1. Alternatively, a different type of second means may be used as, for example, the previously described absorbent means.

Figure 9:
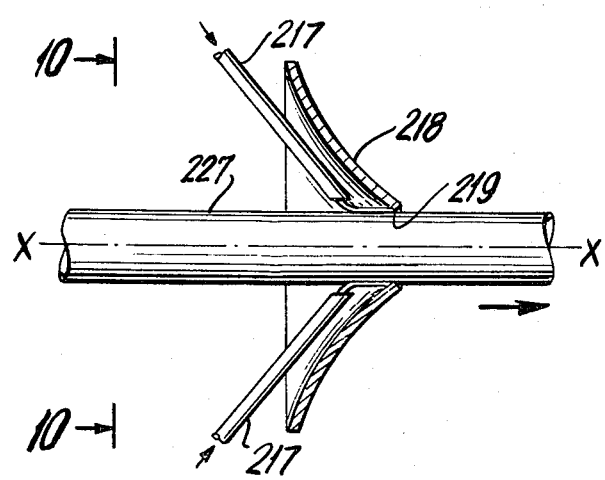
FIG. 9 is a schematic elevational view, with certain parts in cross-section, of a disc-type liquid applicator-distributor embodiment of the first means.
Figure 10:
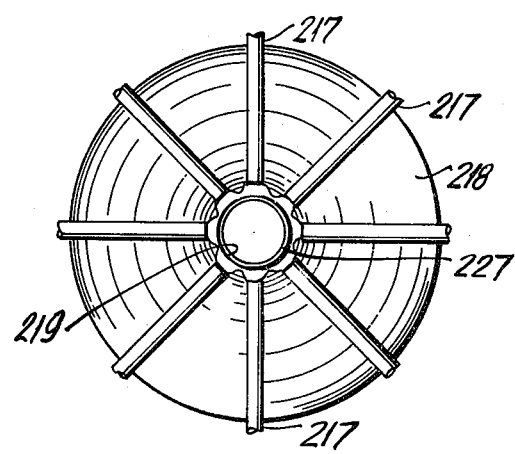
FIG. 10 is an end view of the FIG. 9 disc-type liquid applicator-distributor taken along line 10—10.

In the FIGS. 9 and 10 embodiment, a thin resilient disc is provided as the first flexible and resilient means 218, and it may, for example, be formed of 0.010-0.014 inch thick rubber. Its outer edge may be preferably fixedly retained in a position transverse to the centerline axis x—x with an inner circular opening 219 of slightly smaller diameter than the diameter of the exterior wall of the inflated flexible tubing 227. As the inflated tubing 227 moves in the longitudinal direction through inner circular opening 219 of thin rubber disc 218, the latter's edge is displaced by the tubing 227 exterior wall in the direction of tubing travel, and the disc is resiliently deformed into a cone configuration.

The coating liquid is discharged through a multiplicity of preferably flexible tubes 217 which are positioned in front of the disc-type first means 218 relative to the tubing longitudinal travel. Liquid is thus applied to the tubing exterior wall in the area where the casing longitudinally displaces the thin disc. As the inflated tubing moves through the disc inner circular opening 219, the liquid is distributed by the disc inner edge and forms a ring around the tubing which is subsequently smoothed and evened out by the second flexible and resilient means which may be a similar thin resilient disc or other suitable material as previously discussed.

Although the invention has been specifically described in connection with an embodiment for applying a uniform coating of wood-derived liquid smoke on the exterior wall of an inflated flexible cellulosic tubing, it has also been used with the FIGS. 1-3 apparatus to apply a uniform coating of water soluble food dye on cellulose tubing. In this dye application, the first and second flexible and resilient means were both formed of Omalon 9 open-cell polyurethane absorbent. Unlike the liquid smoke embodiment where the second means was preferably formed of an absorbent lacking Wicking Capability, the dye coating embodiment was found to be most effective (in terms of a uniform coating) when the smoothing was performed with a second flexible and resilient means having Wicking Capability.

Although preferred embodiments of this invention have been described in detail, it is contemplated that modifications thereof may be made and some features may be employed without others, all within the spirit and scope of the invention. For example, the illustrated and described embodiments involve longitudinal movement of the inflated tubing in a horizontal direction, but the longitudinal movement may be in the vertical direction or even an inclined direction.

What is claimed is:

1. An apparatus for liquid coating the exterior wall of an inflated flexible tubing during its longitudinal movement comprising:
   (a) first flexible and resilient means with an inner circular opening having slightly smaller diameter than the diameter of the inflated flexible tubing exterior wall, the first means being transversely positioned relative to the tubing axis and arranged such that the inflated flexible tubing may be moved in its longitudinal direction through said inner circular opening, so as to displace the circular opening edge while maintaining rubbing contact therewith;
   (b) means for supplying said liquid to said first means (a) for distribution thereby, so as to be applied to the longitudinally moving inflated flexible tubing exterior wall during said rubbing contact;
   (c) second flexible and resilient means with an inner circular opening, the second means being rotatable around the opening center and the opening having slightly smaller diameter than the diameter of the inflated flexible tubing exterior wall, said second means being transversely positioned relative to the tubing axis and adjacent to but spaced downstream from the first means (a) with respect to the longitudinally moving tubing such that the tubing with the coating on its external wall may be moved through said inner circular opening of said second means so as to displace the rotating circular opening edge while maintaining rubbing contact therewith for smoothing the applied liquid on the tubing exterior wall as a film of uniform thickness; and
   (d) means for rotating said second means (c) around the tubing axis during its longitudinal movement through said second means so as to maintain said rubbing contact while smoothing said liquid into a continuous film of substantially uniform thickness on the tubing exterior wall.

2. Apparatus according to claim 1 in which said first means is positioned within a support member having an annular distribution groove around and in its outer edge for distributing liquid; and a multiplicity of flexible distribution tubes in flow communication with said annular distribution groove are positioned entirely within said first means, each with its discharge end surrounded by said first means, and oriented toward the support member center.

3. Apparatus according to claim 1 in which said first means is formed of absorbent material and the liquid supplying means (b) extends therethrough.

4. Apparatus according to claim 3 in which said first means has Wicking Capability.

5. Apparatus according to claim 3 in which said first means is formed of open-cell foam.

6. Apparatus according to claim 3 in which said first means is formed of open-cell polyurethane foam.

7. Apparatus according to claim 6 in which said first means has Wicking Capability.

8. Apparatus according to claim 1 in which said second means is formed of absorbent material.

9. Apparatus according to claim 8 in which said second means is formed of open-cell foam.

10. Apparatus according to claim 8 in which said second means is formed of open-cell polyester foam.

11. Apparatus according to claim 2 in which said first means is formed of open-cell polyurethane foam with Wicking Capability and said second means is formed of open-cell polyester foam without Wicking Capability.

12. Apparatus according to claim 3 in which the diameter of the inner circular opening of said first means is between about 12% and about 20% smaller than the Normal Outside Diameter of said inflated flexible tubing.

13. Apparatus according to claim 8 in which the diameter of the inner circular opening of said second means is between about 4% and about 7% smaller than the Normal Outside Diameter of said inflated flexible tubing.

14. Apparatus according to claim 1 in which said first means (a) comprises a brush with individual hairs transversely aligned relative to the tubing axis, and the liquid supply means (b) is positioned immediately upstream said first means (a) relative to said longitudinally moving inflated flexible tubing exterior wall.

15. Apparatus according to claim 1 in which said second means (c) comprises a brush with individual hairs transversely aligned relative to the tubing axis.

16. Apparatus according to claim 14 in which said second means (c) comprises a brush with individual hairs transversely aligned relative to the tubing axis.

17. Apparatus according to claim 1 in which said first means (a) comprises a thin disc, and the liquid supply means (b) is positioned immediately upstream said first means (a) relative to said longitudinally moving inflated flexible tubing.

18. Apparatus according to claim 1 in which said second means (c) comprises a thin disc.

19. Apparatus according to claim 2 in which a multiplicity of rigid liquid inlet tubes are located within said support member and spaced around the perimeter thereof with outer ends in flow communication with said annular distribution groove, and inner ends oriented toward the center of said support member terminating within said first means with each of said inner ends in flow communication with one of said flexible distribution tubes.

20. Apparatus according to claim 1 in which a multiplicity of point supports are positioned in at least one transverse plane relative to the axis of the liquid film-coated inflated tubing longitudinal movement, and are spaced from said second means, each point support being located in a transverse plane and having a rounded inner end for supporting contact with the liquid film-coated exterior wall of said tubing, and with said rounded inner ends in spaced relation from each other.

21. A method for coating the exterior wall of a longitudinally moving inflated flexible tubing with liquid comprising the steps of:
    (a) continuously moving the inflated flexible tubing in the longitudinal direction along a straight line;
    (b) providing first flexible and resilient means with an inner circular opening of slightly smaller diameter than the diameter of the inflated tubing exterior wall;
    (c) supplying liquid to said inner circular opening of the first means;
    (d) moving said inflated tubing through said inner circular opening of said first means and maintaining rubbing contact with the opening edge so as to displace said opening edge and simultaneously apply said liquid to, and distribute the applied liquid around, the inflated tubing exterior wall;
    (e) providing second flexible and resilient means with an inner circular opening of slightly smaller diameter than the diameter of the inflated tubing exterior wall;
    (f) rotating said second means around its centerline axis; and
    (g) moving said inflated tubing with said liquid applied on its exterior wall through the rotating second means inner circular opening and maintaining rubbing contact with the opening edge so as to displace said opening edge while simultaneously smoothing the liquid coating as a continuous film of substantially uniform thickness on the tubing exterior wall.

22. A method according to claim 21 in which said first means is formed of absorbent material, and liquid is supplied to said first means as a multiplicity of discrete streams spaced around the first means outer periphery, and absorptively dispersed about the edge of said inner circular opening for distribution to the moving inflated tubing.

23. A method according to claim 22 in which said inflated flexible tubing is formed of cellulose, said liquid is liquid smoke, and said first means is formed of open-cell absorbent material.

24. A method according to claim 23 in which said first means is formed of polyurethane foam with Wicking Capability.

25. A method according to claim 21 in which said second means is formed of absorbent material and said liquid coating is absorptively dispersed by said rubbing contact as said smoothing.

26. A method according to claim 25 in which said inflated flexible tubing is formed of cellulose, said liquid is liquid smoke, and said second means is formed of absorbent material without Wicking Capability.

27. A method for coating the exterior wall of a longitudinally moving inflated flexible cellulose tubing with liquid smoke comprising the steps of:
    (a) continuously moving the inflated flexible tubing in the longitudinal direction along a horizontally oriented straight line;
    (b) providing first flexible and resilient means formed of an absorbent open-cell polyurethane foam having Wicking Capability with an inner circular opening between about 12% and about 20% smaller diameter than the Normal Outside Diameter of the inflated tubing exterior wall;
    (c) supplying liquid smoke to the outer perimeter of said first means as a multiplicity of discrete streams spaced around the first means outer periphery, and inwardly distributing the so-supplied liquid therethrough to the edge of said inner circular opening by absorptive dispersion;
    (d) moving said inflated tubing through said inner circular opening of said first means and maintaining rubbing contact with the opening edge whereby said opening edge is displaced, and simultaneously applying said liquid to distribute the applied liquid around the inflated tubing exterior wall;
    (e) providing second flexible and resilient means formed of open-cell polyester foam absorbent material without Wicking Capability and having an inner circular opening between about 4% and about 7% smaller diameter than the Normal Outside Diameter of the inflated tubing exterior wall;
    (f) rotating said second means; and
    (g) moving said inflated tubing with said liquid smoke applied on its exterior wall through the rotating second means inner circular opening and maintaining rubbing contact with the opening edge whereby said opening edge is displaced while simultaneously smoothing the liquid coating as a continuous film of substantially uniform thickness on the tubing exterior wall.

28. A method according to claim 27 in which said second means is rotated around its centerline axis at between about 200 and about 250 RPM.

29. A method according to claim 22 in which said inflated flexible tubing is formed of cellulose, said liquid is a water soluble food dye, said first means has Wicking Capability, and said second means is an open-cell absorbent material with Wicking Capability.

* * * * *